United States Patent [19]

Allen et al.

[11] Patent Number: 4,944,679

[45] Date of Patent: Jul. 31, 1990

[54] GENERIC RADAR DISPLAY

[75] Inventors: John H. Allen; Robert S. Reif, both of Orlando, Fla.

[73] Assignee: The United States of America as represented by the Secretary of the Navy, Washington, D.C.

[21] Appl. No.: 416,201

[22] Filed: Oct. 2, 1989

[51] Int. Cl.5 .......................... G09B 9/00; G01S 7/40
[52] U.S. Cl. ............................................. 434/2; 434/3; 434/4; 342/169; 342/181; 342/176
[58] Field of Search ................. 434/2, 3, 4, 6; 342/169, 176, 181, 182, 183

[56] References Cited

U.S. PATENT DOCUMENTS

| | | | |
|---|---|---|---|
| 2,984,915 | 5/1961 | Bomzer et al. | 434/4 |
| 3,229,018 | 1/1966 | Balding et al. | 434/4 |
| 3,413,402 | 11/1968 | Marrero | 434/4 |
| 3,699,669 | 10/1972 | Wolff | 434/4 |
| 3,885,323 | 5/1975 | Kaase et al. | 434/2 |
| 4,198,762 | 4/1980 | Lamasney et al. | 434/3 |
| 4,228,598 | 10/1980 | Warner | 434/3 |
| 4,591,858 | 5/1986 | Jacobson | 434/2 X |
| 4,702,698 | 10/1987 | Beckwith et al. | 434/2 |
| 4,759,716 | 7/1988 | Booker et al. | 434/3 |
| 4,780,084 | 10/1988 | Donovan | 434/2 |
| 4,829,308 | 5/1989 | Tol et al. | 342/185 |
| 4,841,292 | 6/1989 | Zeno | 340/736 |

Primary Examiner—Thomas H. Tarcza
Assistant Examiner—John B. Sotomayor
Attorney, Agent, or Firm—Robert W. Adams

[57] ABSTRACT

A software controlled generic radar display system using a microcomputer having a high performance graphics card that drives a high resolution color monitor which displays the radar sweep, compass rose, front panel symbology and diagnostic information. A target generator provides simulated target information that is displayed on the monitor in standard PPI format.

9 Claims, 3 Drawing Sheets

GENERIC RADAR DISPLAY

BACKGROUND OF THE INVENTION

The invention relates to the field of training devices, and in particular to simulators for the display of radar data. The invention is adaptable in that its software can be modified for compatibility with a variety of target generators; and, then when the invention is appropriately instructed, it will interact with the generator to create an accurate and responsive visual display of the data provided by the generator in accordance with settings selected by the user.

Up to now radar display systems have been dedicated to a single application, and designed around the target generator that is being used. That practice has resulted within the training community in the development of many unique systems that are costly and difficult to maintain. As a result, a need has existed for a radar display that is adaptable, reliable and conveniently supportable.

Accordingly, an object of the present invention is to provide a generic radar display that is adaptable through software changes to achieve compatibility with a plurality of target generators. Another object is to provide a system that may be rendered in embodiments comprising readily available components. Another object is to provide a system with which the user may interact, and that is responsive to the user's inputs. And, another object is to provide a system that is microprocessor based and relatively inexpensive.

Previous patents disclose systems for radar simulation, color mapping, video generators and landmass simulators. U.S. Pat. No. 4,759,716 to John L. Booker discloses a rotating color mapped radar sweep simulator having a rotating cursor plan position indicator radar display on a color mapped computer driven raster scan CRT display that logically divides the pixels of the display into a plurality of wedge shaped regions. The color attributes of the pixels in each region are changed in a systematic fashion in order to simulate the appearance of a standard radar display for radar operator training purposes. U.S. Pat. No. 4,228,598 to Richard T. Warner discloses a radar simulator having an oscilloscope with a display screen that produces a luminous movable screen spot, with a scanning means connected to the oscilloscope for causing the spot to be scanned over the screen in a radar transmitter type scanning pattern, a photodetector mounted in front of the screen for detecting light from the spot only when the spot is near the photodetector and for producing an electrical signal when light is detected, and modulation means connected to receive and modulate the signal in simulation of a radar pulse repetition. U.S. Pat. No. 4,702,698 to Paul B. Beckwith et al, discloses a digital radar generator that provides a radar return image for a cockpit display that is generated by selectively accessing terrain data compressed and stored in a digital map data base. U.S. Pat. No. 4,780,084 to Kenneth B. Donovan discloses a landmass simulator for modifying the areal height and areal reflectivity of source data in real time in response to the areal reflectivity of the source.

SUMMARY OF THE INVENTION

The present invention is a system for accepting simulated radar display information from a target generator and displaying that information on a simulated radar display console. It comprises a general purpose computer that has been prepared to monitor the user inputs on the front panel of the console, acquire data from and communicate with the generator, and implement the functions indicated by the user that normally are performed by specially built hardware. Preparation of the computer refers to the selection of appropriate boards and additional hardware, and to the use of an adaptable application software system. First, the software system initializes and tests the radar display system. Then, the normal operational mode of the software program is entered if no errors are detected. Target information is sent from the generator as analog voltages for the x and y coordinates of the targets and a digital strobe to qualify the analog voltages. A data acquisition board is used to convert the analog signals to digital words for use by the computer, and the digital strobe is used to start the conversion. Current range selection is sent to the target generator from the console by a multi-function board having a digital output port. Other boards read the analog voltages from the intensity controls on the console, read the digital signals from the rotary switches used for making selections, count position change pulses from optical encoders coupled to cursor control cranks, and drive a high resolution color graphics display.

DESCRIPTION OF THE PREFERRED EMBODIMENT

Figure 1:
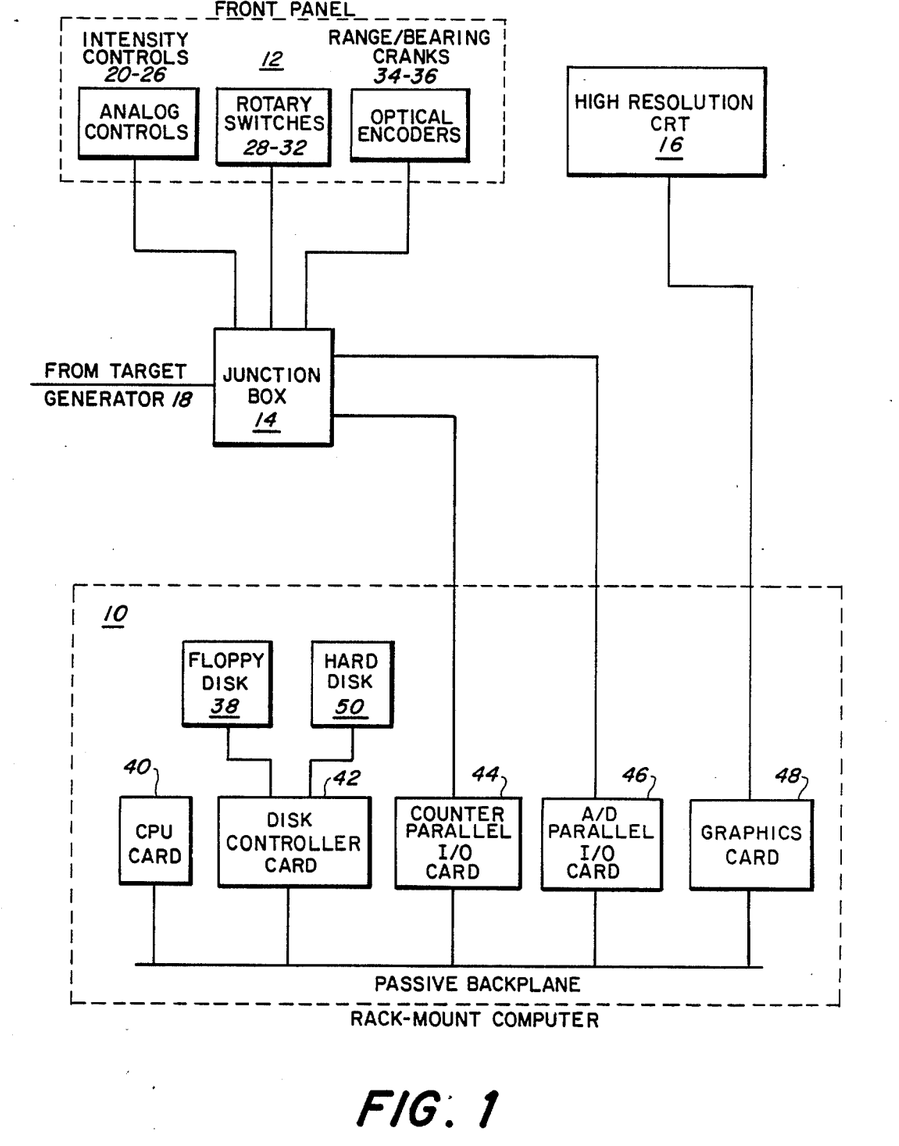
FIG. 1 is a block diagram of the hardware of an embodiment of the invention.

FIG. 1 shows hardware for a preferred embodiment that includes general purpose microprocessor 10, user-controlled panel 12, junction box 14 and display device 16. The invention receives target data from target generator 18 which is a simulation device that provides target coordinate data representative of a specific radar system or family of systems. For data from another target generator that represents a different radar system or group of systems, the present invention may be adapted to generate a display that simulates that system's display. Consequently, the invention is a generic radar display training device that is adaptable through software changes to represent any of a plurality of radar displays.

Panel 12 is the user's means of communicating with the system. The control knobs on the panel may be selected and arranged to approximate the layout and appearance of the corresponding controls on the operational equipment that is being simulated. However, training may be accomplished by adopting the generic layout shown in FIG. 2. Adaptable software routines are included in the invention to generate on display 16 the indicia that would be associated with the control or switch and the response that would be anticipated by a user when he adjusts the knobs on an operational radar system. For example, an emergency shiphandling trainer employs four intensity controls 20–26, one each for video, cursor, rings and graphics. In addition, three menu switches 28–32 are included, one each for decay, range and range rings. Each control may be a potentiometer and each switch may be a rotary switch. Finally, two additional controls 34-36 included in the trainer are the cranks for range and bearing. The indicia associated with each knob is software controlled and appears on display device 16 adjacent to the knob. For example, adjacent to decay switch 28 on display 16 in the embodiment is the title, Decay Seconds, and the five ranges, ½, 1, 2, 4 and 8. A calligraphy software unit that hereinafter will be discussed, programs processor 10 to display the indicia associated with switch 28, and causes the indicia to be highlighted that corresponds to the setting selected by the user. With respect to the range and bearing readings on display 16, the indicia expressed in degrees is software generated and responsive to the user's manual operation of cranks 34 and 36. The compass rose shown on the display is not expected to change, and preferably is digitally saved in an image file and written directly to the microprocessor's graphics board during initialization of the system.

Figure 3:
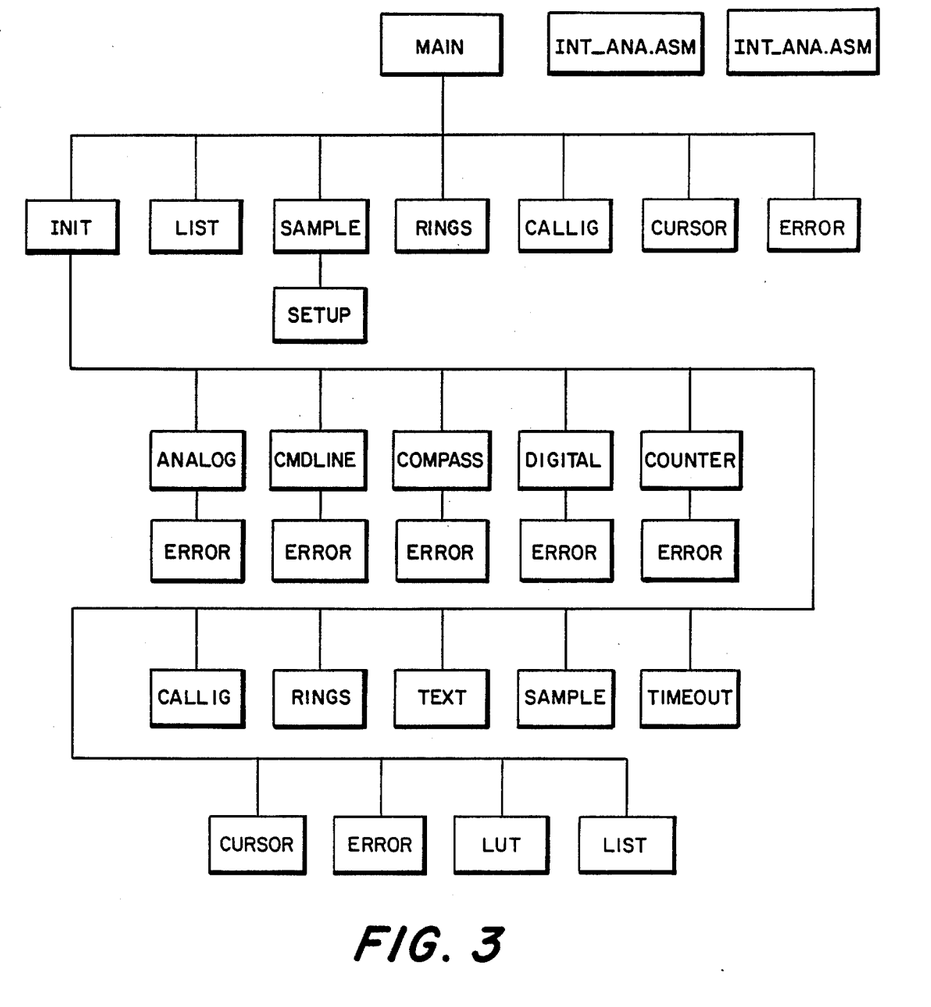
FIG. 3 is an organizational diagram of the software components used in an operational embodiment of the invention.

FIG. 3 graphically illustrates the top-level architecture of the invention's software. A copy of the source code is included in Annex A. The software can operate in one of two modes. The first mode is the initialization and self test mode. This mode occurs at the beginning of program execution. If no errors are detected while in this mode, the second mode of operation is entered. The second mode is normal operational mode for the program. It allows the software to interact with target generator 18, and with the user.

The embodiment described was operated using approximately 49k bytes of memory for code and 400k bytes of memory for data. With an operating system that uses approximately 45k of memory, the embodiment can operate on a microprocessor that has at least 512k of random access memory. Processing time is dependent in part on the execution time of individual software components which varies depending on external inputs. Since the software was developed for an embodiment using a target generator having a data packet rate of 18 Hz and the embodiment described operates with a target generator data packet rate of 15 Hz, there is ample computing power reserve of at least 16.7%.

Software component Main contains the main program which performs the hardware and software initialization and testing and is responsible for displaying target and front panel information on the graphics screen. Program execution begins by initializing and testing sub-systems within the computer system. Software components requiring initial conditions for proper operation are also initialized. If a problem is encountered during this phase of program execution, an error message is displayed and program execution stops. Hardware and software initialization and testing are performed in the sub-level software component Init.

After initialization is completed, the program enters an endless loop. While in the loop, a flag is checked to determine if a data packet has been received from target generator 18. The flag setting is performed in Init-Time in response to an interrupt generated by the system timer. The system timer interrupt is generated when the timer's count is allowed to decrement to zero. During target data packet acquisition, individual target coordinates are sent every 380 microseconds. After each individual target is received, an interrupt is generated by the data acquisition board. The interrupt service routine in Int-Ana programs the system timer to generate an interrupt after 1000 microseconds. As long as individual target coordinates are received faster than the system timer count down period, the system timer will not generate an interrupt. However, 1000 microseconds after the last target in the data packet is received, a timer interrupt is generated.

When the flag signaling receipt of a data packet from target generator 18 is found to be set, the flag is reset and target data processing begins. The component List is responsible for the processing and displaying the target data. Each target coordinate in the target data packet is converted to screen coordinates for display device 16 and saved in the target array. The target array is arranged as a ring buffer with groups of data packets of the same age arranged together. When targets are added to the target array, they are placed at the head of the ring buffer. Targets at the end of the ring buffer are the oldest and need to be removed. Since targets can overlap on the screen of display device 16, a target should not be automatically erased when it is removed from the target array. The target needs to be examined to determine if it has been overwritten by a younger target. If the target has not been overwritten, it is erased from the screen. Reading a pixel from the screen is very time consuming, so a shadow copy of the screen is kept in main memory. Whenever a target is drawn or erased from the screen, the same operation is performed on the shadow screen array;. Now that the old targets are removed from the screen, the new targets are drawn on the screen and also added to the screen array.

In order to simulate phosphor decay, the target's intensity on the screen of display device 16 is gradually reduced with time. Intensity is shown by color, and decay is accomplished by changing the color. Rather than redrawing all the targets on the screen with a new color every time their intensity is reduced, the color in the color table is changed. The color table is changed rotationally at the same rate groups of targets are added and removed. This has the effect of causing all new targets to be drawn at full intensity while the intensity of all older targets decrease. A target's intensity will decrease until it is no longer visible which matches the moment the target is removed from the ring buffer.

Figure 2:
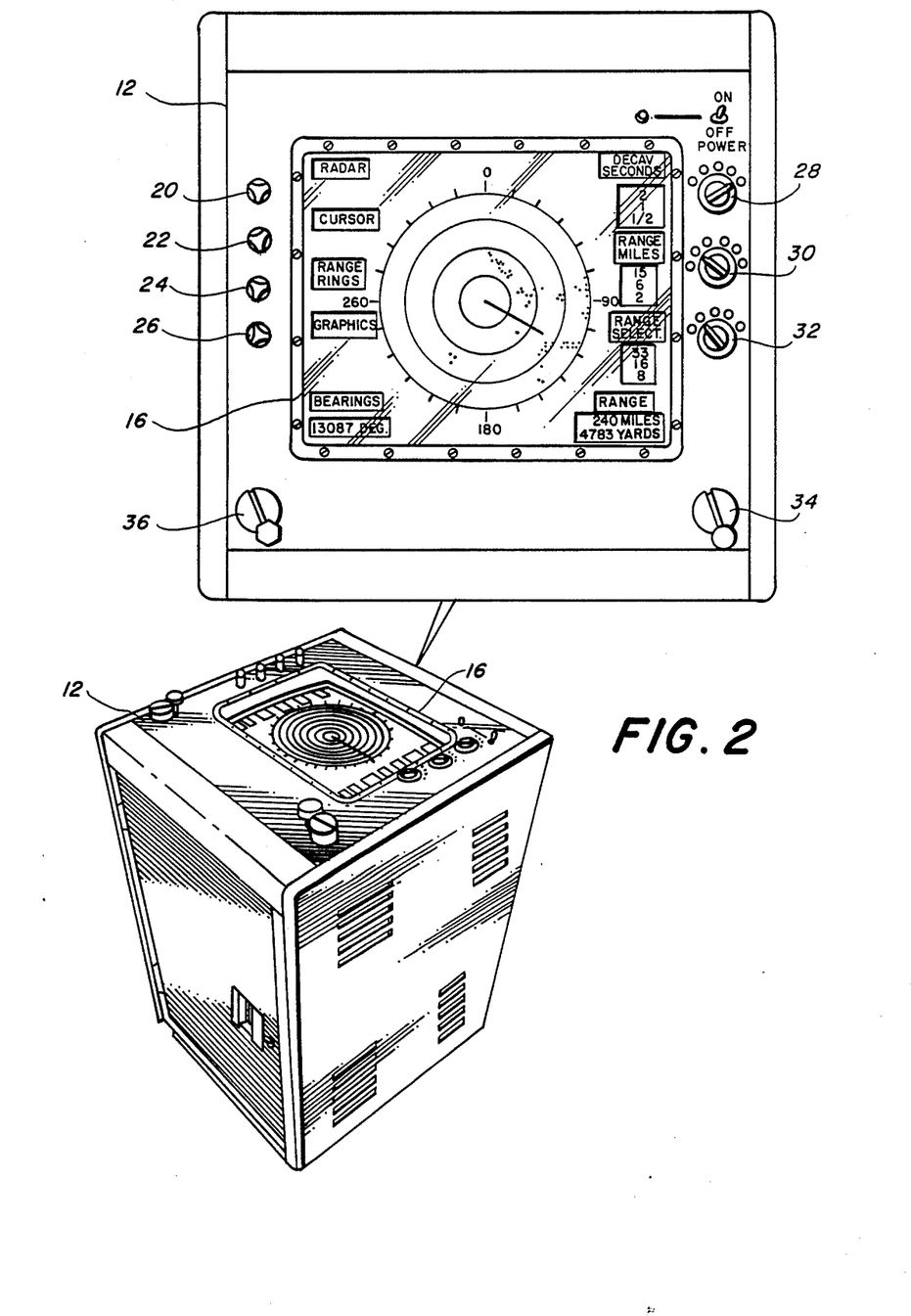
FIG. 2 is a graphic depiction of the console of the embodiment, showing the user controls and a representative graphics display.

The controls on front panel 12 are now read and their settings are compared to their previous settings by component Sample. If a change has been detected, either a flag for that control is set or some action is taken. If the control that changed was an intensity control 20-26, the intensity of the objects associated with that control are altered on the screen by modifying the color table for those objects. Otherwise the control's setting is retained.

Calligraphy for the range and bearing readouts associated with cranks 34 and 36, and for the decay, range rings and range selector switches 28-32 is updated by the component Callig. Calligraphy associated with a control is updated only when the flag for that control is set. The range rings inside the compass rose are updated by the component Rings when the flags associated with the range rings or range scale switches are set. The cursor is updated by the component Cursor when the flags associated with the range or bearing cranks is set.

If a runtime error associated with the data acquisition board is detected, the data acquisition board and all associated hardware are reinitialized. The hardware associated with range and bearing cranks 34 and 36 also is reinitialized because external noise can cause the data acquisition board to become confused and fail to operate properly.

If a flag signaling receipt of a data packet from target generator 18 is not set within a predetermined period of time, it is assumed the data packet is missing. First, the data acquisition board is checked for errors. If the board is found to be in error, all hardware associated with data acquisition is reinitialized. Otherwise, the board is software triggered to simulate the acquisition of target data, which allows the system to continue operation in the absence of target packets from generator 18. In either case, an error message is drawn on display device 16.

The component Init is responsible for initializing and testing subsystems within microprocessor 10 and for initializing other software components. Execution begins by initializing the graphics board power-up self-test results are examined and an error message is displayed if errors are detected. Command line arguments to the program are examined for alignment information in the component Cmdline. When information is found, the proper alignment variables are updated. If improper arguments are encountered, an error message is displayed. The component List is responsible for initializing all targets in the target array to the erased state. All targets in the screen array also are initialized to the erased state. Graphics board command lists for partial erasure of targets from the screen are created. The component Timeout is responsible for reprogramming the system timer and system timer interrupt vector. The component Analog is responsible for initializing and testing the data acquisition board, which is necessary for proper operation of the board and associated hardware. In addition, Analog is responsible for initializing and testing the Direct Memory Access (DMA) controller, interrupt controller and interrupt vector. If any of the tests fail, an error message is displayed on device 16. The component Digital performs a loop back test on the target generator interface to assure that the current range selection can be continuously communicated to generator 18. If an error is detected, an error message is displayed. The component Sample reads the positions of digital switches 28-32 on front panel 12 in order to initialize certain variables in some of the components that require the positions for proper initialization. Component Text defines new text fonts that are used wherein default text fonts for numbers are unacceptable for the calligraphy.

Range and bearing cranks 34 and 36 are attached to optical encoders which read position changes. The optical encoders are connected to a counter board which counts the number of clockwise and counter clockwise pulses from the encoders at the rate of one pulse per degree. The counter board is programmed for this function in the component Counter. A loop back test is performed and if an error is detected, an error message is displayed. The compass rose displayed on the screen of display device 16 is saved in an image file on disk. The component Compass is responsible for reading the file from disk and writing the image to the screen. If an error is encountered while reading the file from disk, an error message is displayed. The initial range rings are drawn on the screen by component Rings based on the selection of range switch 32 and the position of range rings switch 30. Component Callig is responsible for drawing the initial calligraphy for range and bearing readouts, switch position indicators and legends and intensity control legends. Command lists also are generated for manipulating the calligraphy.

Manipulations of the color lookup table component Lut are used to perform target decay and intensity changes. Having independent logical bit planes for different types of objects on the screen makes the color table complicated. Intensity changes and target decay can require massive color table changes. Command lists are generated for properly manipulating the color table.

When an error is encountered, an error message is displayed on the screen. There are two types of errors which generate messages. A diagnostic error message is displayed when an error is detected during self testing and a run time error message is displayed when a run time error is encountered during normal operation. When a diagnostic error is detected, a message is displayed on the screen which lists which test failed. Under normal operation, the program would stop execution at this point, but if a keyboard is attached to the system, information can be obtained about the test failure. Program execution also can be continued if desired. If an error is detected during the data acquisition process, an error flag is set indicating the type of error. When the flag is set, an error message is displayed indicating the type of error.

When the main program is invoked by a line in the batch file Autoexec, arguments containing target screen alignment information may be passed on the command line. The arguments can alter the scaling and offsetting of target data when it is converted to screen coordinates. If the command line arguments are incorrect, an error message is displayed.

The component List is responsible for all processing and displaying of target data. During initialization the target and screen arrays are initialized and command lists are generated for erasing targets from the screen. During normal operation the raw target data from the target generator is converted to screen coordinates and saved in the screen array. Targets are removed from the screen array, when they have decayed away. Before removing the targets from the screen the screen array is checked to determine if the targets have been overwritten, and if they have they are not removed from the screen. Otherwise they are removed from the screen array and from the screen using the appropriate command list.

The component Analog is responsible for initializing and testing the data acquisition board and associated hardware and restoring the associated hardware to its original state at program completion. During initialization, the data acquisition board is reset and various tests are performed. The DMA controller, interrupt controller and interrupt vector also are initialized and tested. If an error is encountered during the initialization and testing, an error message is displayed. In order to restore proper operation of the computer system, the data acquisition board is reset and the DMA and interrupt hardware is restored to its original state.

The component Sample is responsible for reading the front panel controls and setting the necessary flags and variables needed to use the values sampled. The value of switches 28-32 are read and compared to their previous values. When it is determined a change has occurred, the new switch setting is saved and a flag is set to indicate the switch has changed. If range switch 32 changes, the new range also is sent to target generator 18. The settings of intensity controls 20-26 can be determined by examining the raw data from the data acquisition boards in the DMA buffer. If the data differs from the previous value more than would be expected from normal noise, the value is saved and the appropriate intensity control command list is run to modify the color lookup table. The counter board is read to determine if range or bearing cranks 34 and 36 have changed position. If a change is detected, the absolute change is calculated and saved and a flag is set to indicate a change has occurred. If not front panel control changes have been detected for thirty minutes, the screen of display device 16 is blanked to prevent the image from burning into the phosphor of the CRT tube. Once the screen is blanked, any front panel control change will restore the screen display. If a keyboard key press has been detected, the program enters a setup mode which allows the target data to be scaled and offset for proper alignment. The alignment data is saved in the batch file Autoexec.

The component Rings is responsible for drawing the initial range rings on the screen during initialization and for updating the rings when a change has occurred in range selection switch 32 or range ring switch 30. The initial range rings are drawn on the screen based on the positions of the two switches. The range rings are updated when the flags are set that indicate the range selection or range rings switches have changed. Drawing or removing range rings is a time consuming graphics operation. Most changes require doubling or halving the number of range rings on the screen, so whenever possible only every other ring is drawn or erased. Otherwise, all the rings are erased from the screen and the new rings are drawn.

The component Callig is responsible for drawing the initial calligraphy for range and bearing readouts, switch position indicators and legends and intensity control legends, and for updating the calligraphy when necessary. During initialization, the initial calligraphy for range and bearing readouts, switch position indicators and legends, and intensity control legends are drawn on the screen. Command lists are generated for manipulating the calligraphy. Calligraphy for the range and bearing readouts and for the decay, range rings and range selector switches are updated only when the flag for that control is set. Command lists are used to erase the old range and bearing readouts and for updating the switch position indicators.

The component Timeout is responsible for initializing the system timer and associated interrupt vector during initialization and restoring the system timer and interrupt vector to their original states at program completion. The component Digital is responsible for testing the range scale interface to target generator 18. A loop back test is performed on the interface and if an error is detected, an error message is displayed. The default characters for numbers are not suitable when scaled to the size needed for calligraphy so new fonts are defined for these characters by the component Text. Range and bearing cranks 34 and 36 are attached to optical encoders which read position changes. The optical encoders are connected to a counter board which counts the number of clockwise and counter clockwise pulses from the encoders at one pulse per degree. The counter board is programmed to count the pulses from the encoders. A loop back test also is performed and if an error is detected, an error message is displayed. The compass rose displayed on the screen is saved in the image file compass.dat on disk. The file is read from the disk and is displayed on the screen by writing the file directly to the graphics board. If an error is encountered while reading the file from disk, an error message is displayed.

When the setup mode is invoked by a key press, an alignment menu is drawn on the screen of display device 16. The keyboard may be used to select a scale or offset mode or to save the present alignment settings in the batch file Autoexec. Cursor keys are used to increase or decrease the scale or offset of the two axes as desired. When exiting the setup mode, the new alignment information is saved in the batch file Autoexec. Cursor keys are used to increase or decrease the scale or offset of the two axes as desired. When exiting the setup mode, the new alignment information is saved in the Autoexec batch file, and the setup menus are removed. The Cursor software unit is responsible for updating the cursor when range or bearing cranks 34 and 36 change position. When it has been determined by examining the proper flags that the cursor needs updating, the present cursor is erased from the screen. The range and bearing crank counts are examined and the new range and bearing calculated. The new screen coordinates of the cursor are calculated, and clipped to the display boundary if necessary. The new cursor then is drawn on the screen of display device 16.

The component Int_Ana.Asm contains the interrupt service routine for the data acquisition board. When a DMA transfer has been completed, the data acquisition board generates an interrupt signaling completion. The contents of the DMA buffer associated with the target information then is transferred to a data packet buffer. The data acquisition board also generates an interrupt when a run time error occurs, so the reason for the interrupt is determined and the error flag is set accordingly. The component Int_Time.Asm contains the interrupt service routine for the end of data packet timeout interrupt. A flag is set in response to an interrupt generated by the system timer. The system timer interrupt is generated when the timer's count is allowed to decrement to zero, which occurs 1000 microseconds after the last target in the target packet is received from target generator 18.

The principles of operation of the hardware embodiment shown in FIG. 1 relate to microprocessor 10, control panel 12, junction box 14, and display device 16. The microprocessor that was used with the above-described software in an operational embodiment is AT compatible, wherein AT is a reference to the product made by IBM Corporation. It comprises a rackmount chassis, a 10 slot passive backplane motherboard, a 1.2 Mbyte high density floppy disk drive 38, a 30 Mbyte hard disk drive, a 150 watt power supply, a cooling fan and associated computer cards 40-48. In accordance with the software, microprocessor 10 processes inputs from the user and target generator 18, and provides outputs to display device 16 and generator 18. The system software and alignment variables are stored on hard disk 50. The system operates under DOS 3.2 or higher, and automatically loads and executes the operational software upon power-up.

Control panel 12 provides a means for the user to provide an input. The signals from the panel are distributed to microprocessor 10 and its cards by junction box 14. Power for panel 12 is derived from the 5 VDC power supply of microprocessor 10. Display device 16 that was used in the embodiment is a high resolution color display monitor that will accept a wide variety of video signals but that has been configured to accommodate a video input having a noninterlaced vertical scanning method, a sync method that is composite synch on green video, RGB video amplitudes that are approximately 1 volt p—p, a composite sync level that is approximately 0.3 volt, and vertical and horizontal line scan frequencies of 60 Hz. The monitor displays the video generated by graphics card 48 during normal operation.

Intensity controls 20–26 are potentiometer controls in the embodiment that each provide analog data that varies from 0 VDC at minimum to 5 VDC at maximum. The signals from controls 20–26 are sent to A/D card 46 on channels 2–5, respectively, whereat they are converted to digital. Each channel is sampled periodically under software control by A/D-I/O card 46. The digital data is processed by the software to adjust the appropriate display intensities. On the other hand, rotary switches 28–32 together provide 16 bits of digital data to the digital subsystem of A/D-I/O card 46. Each bit represents a switch position. The digital data is periodically gathered and processed by the software, and the appropriate display is generated. Power is provided to switches 28–32 by the 5 VDC panel power.

Bearing and range cranks 34 and 36 control cursor azimuth and range, and are mounted on the shafts of optical encoders. Each encoder produces two 5 volt digital pulse data streams that are 90 degrees out-of-phase with each other and that have a frequency proportional to the rotational speed of the encoder shaft. The out-of-phase data streams from each encoder are used to clock up-down counters on counter/digital I/O card 44, and to inhibit the clocking.

After power is applied to the system, BIOS firmware stored on CPU card 40 performs initialization and, if needed, diagnostic tests on cards 40 and 42, the disk drives and the keyboard, if present. If no errors are indicated by the tests, DOS software is loaded from hard disk 50, and system control passes to DOS which executes the batch file Autoexec. It executes and passes alignment parameters to the operational software, listed in the Annex under main.exe. The first function of the operational software is to initialize graphics card 48 and clear the screen of display device 16. The color look-up table Lut on graphics card 48 is initialized in a manner that separates the video memory into bit planes with only the top plane being visible. The message, Self Test In Progress, then is placed on the top plane. If an error is detected in graphics card 48 during power-up, the card reports an error and a diagnostic error message is displayed.

Buffers and arrays used by the target management processes are initialized. At a later point in time, these buffers and arrays are used to store raw radar target information and color indexes al all the radar target information and color indexes of all the radar targets arranged by target position. Next, analog/digital I/O card 46 is initialized for triggered scan DMA mode. Tests are performed to assure correct DMA operation by placing voltages on the two digital-to-analog (DAC) output channels and sampling the data with two unused analog-to-digital (A/D) input channels. After successful completion of the tests, intensity controls 20–26 and switch controls 28–32 are sampled to determine initial settings. If card errors are detected a diagnostic error message is displayed.

After panel 12 is sampled, counter/digital I/O card 44 is initialized and tested to enable the counters to respond to the encoder data of panel 12. Bits on the digital output port are set and read by the digital input port and an unused counter. Range data is placed on the digital output port forming part of the signal interface between target generator 18 and the system. The data is used by generator 18 to determine range selection. If card errors are detected a diagnostic error message is displayed. The next steps produce the initial operational display. The file Compass.dat which contains the compass rose data is read from hard disk 50 and placed into video memory for graphics card 48. If for some reason the file cannot be opened for reading, a diagnostic error is reported. If no diagnostic errors are reported the self test message is erased, and the range rings and control symbology are generated and drawn. At this point the video memory for graphics card 48 contains all the essential features of the operational display. Finally, the color Luts for graphics card 48 are manipulated to make the completed operational display visible on the screen of display device 16. After the display appears, the software process enters a polling loop that is loosely coupled to the receipt of the external Strobe pulse signal from target generator 18.

The pulse signal Strobe from target generator 18 is used to trigger the A/D conversion of the analog X and Y packets of data representing radar target location on display device 16. Each packet of data contains the X and Y location for self, plus approximately 18 other targets. The number of targets within a packet and the timing of the packet itself may vary slightly both from bridge to bridge and packet to packet due to timing irregularities with the target generator. Strobe is generated every time there is a new piece of X and Y analog data available. If Strobe is received by the system, it triggers channel sampling and A/D conversion by A/D-I/O card 46. Channels 0 through 5 are sampled. The card then sends a DMA request to CPU card 40, and when it is acknowledged the 6 channels of converted analog data are transferred to an area in the memory of card 40 serving as a temporary data buffer. At the end of the DMA transfer, an interrupt is sent and a software data handler sets a hardware timer for a period of time greater than that of the next anticipated Strobe pulse. A flag is set, indicating receipt of a Strobe. The radar target data in the buffer is transferred to the target array, the panel intensity control data is processed and stored to reflect new control positions. When the timer times out, the end of a data packet is assumed; the flag is cleared; and, target management, data I/O and display update processes begin. The target management process determines the current color index of the new targets and places it into the target array along side all the indexes of the old radar targets. The target array is used by the target management process to determine target obscuration and to determine which targets to remove from the radar display area at the end of their active life. Within the data I/O process the digital subsystem of A/D-I/O card 46 is read and processed to determine the new switch control values on panel 12. The counter data of counter/digital I/O card 44 is gathered and processed to determine the new values and position for cursor bearing and range. Range selection data is placed on its digital output port which forms part of the interface between target generator 18 and the system. As part of the display update process, the color indexes in the Luts on graphics card 48 are changed to reflect current decay switch and intensity control positions. The position of the cursor and range rings is updated. Radar targets at the end of their active life are removed and new radar targets are added if they are received. All symbology on panel 12 is updated to reflect new control positions. The polling loop then enters a software timing loop which checks the condition of the flag to determine whether another data packet is being received for generator 18. If the anticipated packet arrives during the timeout period, the polling process begins the target management, data I/O and display processes again. If the anticipated packet is not received during the timeout period an error message, Not Receiving Data, is displayed and a request is issued to A/D-I/O card 46 to scan the 6 channels. The analog data will be converted just as if the card had received the Strobe pulse. The card will initiate a DMA request, and data will be transferred to the temporary buffer, as before. X and Y analog data on channels 0 and 1 will be ignored. Intensity information on channels 2-5 will be processed, as before. Target management, data I/O and display processes will continue, as before. If a packet arrives during the next timeout period the polling process will remove the error message and the software process will once again resume its loose coupling with Strobe. In any event, the polling loop will continue until the Esc key on the keyboard is pressed. At that time the process will halt and exit to DOS.

CPU card 40 includes an 80286 based microprocessor card with 512k bytes of DRAM memory and an 80287 math co-processor. It contains BIOS and SETUP firmware stored in two 32k×8 EPROMS. The SETUP utility allows the card to be altered to respond to various computer system configurations. Configuration data is stored in 50 bytes of battery backed-up CMOS RAM and is used by BIOS during power up to initialize the card. During system operation, the card is performing operations under control of BIOS or SETUP firmware, DOS, operational system software or various software diagnostics. It is firmware configured to operate at a speed of 10 Mhz. Card 40 is jumper configured to provide 2 wait states on external 16 bit memory and I/O cycles. Hence, an AT system compatible bus structure is provided by the card even though the microprocessor operates at 10 Mhz. Cards sharing the bus are I/O mapped or memory mapped into the microprocessor address space. The microprocessor may address these locations directly to control or communicate with other cards sharing the system bus. Some system cards support DMA operations as a means for data transfer. Card 40 DMA controller supports seven DMA channels, 0 through 7. After system initialization and testing, data from panel 12 and data from generator 18 provided by the two I/O cards 44 and 46, are processed under software control to generate the graphics commands sent to graphics card 48. Also, CPU card 40 generates the range selection data provided to generator 18 by counter/digital I/O card 44, and performs run-time diagnostics.

Graphics card 48 provides an intelligent graphics control system that resides on the computer system bus. The card processes high level graphics commands generated by CPU card 40. Communication between card 40 and graphics card 48 takes place via three first-in-first-out buffers and a control block which is memory mapped into a 1K byte area of the reserved external address space of CPU card 40. Graphics card 48 contains its own CPU which acts as a parses for the commands generated by CPU card 40. Also, the graphics card processes any data accompanying the commands if required to do so, and generates instructions for a drawing processor. The drawing processor places the graphics primitives such as alphanumerics, points, lines and polygons, into a 2K by 1K byte video display memory. Each byte in the display memory frame buffer represents a pixel. THe 8 bit pixel data corresponds to the color index of the pixel being drawn. The index points to a 24 bit location in the color look up table. Each byte of the three byte value represents the intensity of one of the primary display colors, red, green or blue. As the display memory is scanned in the pre-selected video format, the three 8 bit values are converted to analog video signals. The signals together with video timing information comprise the video output data in red, green and blue sent to the monitor of display device 16. The video forms the non-interlaced 1280×960 pixel resolution operational display on the monitor.

Analog/Digital I/O card 46 provides a means to convert the analog data from panel 12 and generator 18 into a digital format for eventual processing by CPU card 40. Also, card 46 provides a means for input of digital control data from panel 12. Converted analog data is transferred into a 20 byte buffer in the memory of CPU card 40 via a DMA operation on channel 5. The address of the buffer is determined and loaded into the DMA controller during initialization. A/D-I/O card 46 contains 8 control dat registers which are I/O mapped into the CPU card's external I/O address space. Digital data from panel 12 is separately accessed by CPU card 40 via the digital I/O data register and is not part of the DMA operation. Card 46 is jumper configured to allow eight differential, bipolar, analog inputs. Analog data is gathered via zn A/D triggered scan DMA operation mode. The trigger source either is the Strobe pulse from generator 18 or a software trigger if the Strobe pulse is missing. In the triggered mode, the trigger begins a sequence of six A/D conversions, one for each operational analog input channel 0 through 5. A pacer clock clocks the sequential conversions. The clock frequency is determined by setting the pacer clock control register during initialization. Channels 6 and 7 are used only during the power up diagnostic test to determine proper DMA operation and to determine whether the A/D conversion is correct. A/D-I/O card DACs 0 and 1 provide the predetermined test voltages to the two channels. Digital data for the switches of panel 12 are read by accessing the 16 bit DIO data register.

Counter/Digital I/O card 44 provides a means to input the range and bearing optical encoder data from panel 12 into microprocessor 10. Also, the card provides digital range select data to generator 18. Card 44 contains 4 control/data registers that are I/O mapped into the external I/O address space of CPU card 40. The first two I/O locations are used for counter control and counter data I/O, the second two are used for digital data input and output. Each encoder on panel 12 produces two 5 volt digital pulse data streams that are mutually 90 degrees out-of-phase. The streams have a frequency that is proportional to the rotational speed of the encoder shaft. By convention these two digital pulse streams are known as the sine and cosine signals. The sine and cosine signals from each encoder are used to clock four counters on counter/digital I/O card 44, and also to inhibit clocking of them. Counters 1 through 4 are assigned to encoder input. Counter 5 is used for a loopback test with its input provided by two bits of the digital output port. In addition to the two bits which are used for test purposes, 4 bits of the digital output port are used to send range select data to generator 18. The same 4 bits of data are provided to the digital input port, which provides another loopback test on the condition of the output port.

Controller card 42 controls access to the disk drives. The card contains control/data registers that are I/O mapped into the reserved I/O address space of CPU card 40. There are separate addresses for floppy disk drive 38 and for hard disk drive 50. Data transfer can be performed by CPU card 40, or through a DMA operation.

It will be appreciated that although the present invention has been described in a particular embodiment, the teachings herein may be applied to a number of radar displays for training devices. Furthermore, the foregoing description relates only to the typical embodiment of the invention. It will be readily apparent to one skilled in the art that minor variations may be made without departing from the spirit of the invention, and it is therefore intended that the invention not be limited to the specifics of the preceding description but rather embrace the full scope of the following claims.

What is claimed is:

1. Radar simulation apparatus comprising a microprocessor system having an input subsystem for receiving the output stream of data from a target generator, and having an output subsystem capable of displaying a simulated radar return image, and being adapted to interact with said target generator and process its output, including timing means responsive to said stream from said target generator for initiating said processing a preselected period after an interruption of said data that exceeds a predetermined rate for packets of said data, assembly means responsive to target coordinate data for converting it to a predetermined coordinate system that is compatible with said output subsystem and assembling the converted target data in digital storage by age such that each target has at least one digital bit that correlates to a position on the predetermined coordinate system including an index that correlates to the time relative to other targets that the target data was received by the system, decay means responsive to the relative age of the stored coordinates and including a preselected color table having a relationship to said index, for rotating the color table in coordination with said rate such that the color related to said index changes from one color to another and will progressively appear less bright on said output subsystem each time said table is rotated, and presentation means responsive to said stored coordinates and said decay means for providing a signal to said output subsystem that denotes the coordinates of the targets in storage and their relative intensities by age, said microprocessor means comprising a general purpose computer adapted by software, and wherein said timing means, said assembly means, said decay means and said presentation means are adjustable by software modification for use of said system with a plurality of target generators.

2. The apparatus of claim 1 wherein said assembly means includes video memory on a graphics card and said assembled data is stored thereon in accordance with its converted coordinates, said decay means comprises eight colors denoting eight levels of decay, and said stored target data comprises three binary bits that are fixed at storage and that together correlate to said index.

3. The apparatus of claim 1 further comprising compass rose data in storage and manually operable controls coupled to said input subsystem for providing user selection of range and bearing, range scale, and range rings for the display, wherein said assembled data comprises an eight bit byte for each location in said video memory, three bits of which pertain to color related to the target, a different three which pertain to color related to the compass rose, a different bit which pertains to color related to range rings, and a different bit which pertains to color related to the range and bearing cursor.

4. The apparatus of claim 3 wherein the eight bits of assembled data are arranged by bit plane hierarchy with the cursor bit having the highest display priority, the range rings bit having second-highest display priority, the compass rose bits having third-highest display priority and the target bits having lowest display priority, such that targets in bytes that include bits denoting a segment of the range rings or a segment of the cursor will appear overwritten thereby on the display, and range rings in bytes that include bits denoting a segment of the cursor will appear overwritten by the cursor on the display.

5. The apparatus of claim 1 wherein said microprocessor system comprises a microprocessor, said output subsystem comprises a raster scan video monitor, said presentation means comprises a graphics card installed in said microprocessor connected to said monitor, and said input subsystem comprises counter and converter input/output cards installed in said microprocessor.

6. The apparatus of claim 5 further comprising a panel having a user operable digital control coupled to said converter input/output card and providing an output signal to variably select the period of decay for the displayed targets, and a user operable analog control coupled to said converter input/output card and providing an output signal to variably set the intensity of said display, and wherein said converter input/output card comprises an analog to digital converter of said target data from the target generator and said output signal from said analog control.

7. The apparatus of claim 5 further comprising a panel having user operable continuously variable controls for range and bearing coupled to said counter card and providing an output signal to position a straight line on the display denoting a cursor.

8. The apparatus of claim 7 wherein said range and bearing controls comprise optical encoders.

9. The apparatus of claim 5 further comprising a panel having a user operable control for selecting range and providing an output signal communicating the selection to said microprocessor, and a signal interface means coupling a digital output port of said microprocessor to said generator for providing a signal from which the generator can determine the selection of range made by the user.

* * * * *